(12) United States Patent
Bagger

(10) Patent No.: US 9,703,737 B2
(45) Date of Patent: Jul. 11, 2017

(54) METHOD, APPARATUS, AND SYSTEM FOR IMPROVING INTER-CHIP AND SINGLE-WIRE COMMUNICATION FOR A SERIAL INTERFACE

(71) Applicant: INTEL CORPORATION, Santa Clara, CA (US)

(72) Inventor: Oluf Bagger, Aalborg (DK)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 13/840,885

(22) Filed: Mar. 15, 2013

(65) Prior Publication Data

US 2014/0281082 A1    Sep. 18, 2014

(51) Int. Cl.
   *G06F 1/26*   (2006.01)
   *G06F 13/364*  (2006.01)
   *G06F 13/40*   (2006.01)

(52) U.S. Cl.
   CPC .............. *G06F 13/364* (2013.01); *G06F 1/26* (2013.01); *G06F 13/4068* (2013.01); *Y02B 60/1228* (2013.01); *Y02B 60/1235* (2013.01)

(58) Field of Classification Search
   CPC ........ G06F 3/38; H04L 25/40; H04L 25/4908
   See application file for complete search history.

(56) References Cited

U.S. PATENT DOCUMENTS

| | | | |
|---|---|---|---|
| 5,867,043 A * | 2/1999 | Kim | 327/257 |
| 7,099,970 B1 * | 8/2006 | Foegelle et al. | 710/110 |
| 2003/0039313 A1 * | 2/2003 | Inoue et al. | 375/259 |
| 2010/0284525 A1 * | 11/2010 | Sander et al. | 379/93.06 |
| 2011/0194569 A1 * | 8/2011 | Sander et al. | 370/468 |

* cited by examiner

*Primary Examiner* — Tim T Vo
*Assistant Examiner* — Phong H Dang
(74) *Attorney, Agent, or Firm* — Law Office of Herbert T. Patty; Herbert Patty

(57) ABSTRACT

A system and method consistent with the present disclosure includes a master device, bus interface link, and slave device. The master device includes a power supply and a detection unit to detect an impedance of the power supply. The inverter provides a first path to the power supply on a first stage of a clock signal and. Further, the inverter provides a second path to a first ground line on a second stage of a clock signal. The bus interface link couples the master device to a slave device. Additionally, a bi-directional communications line is coupled to the bus interface link. A gating component provides a second ground line to the power supply through the first path. Furthermore, a receiver determines bit values from a plurality of clock data signals transmitted from the master device.

20 Claims, 8 Drawing Sheets

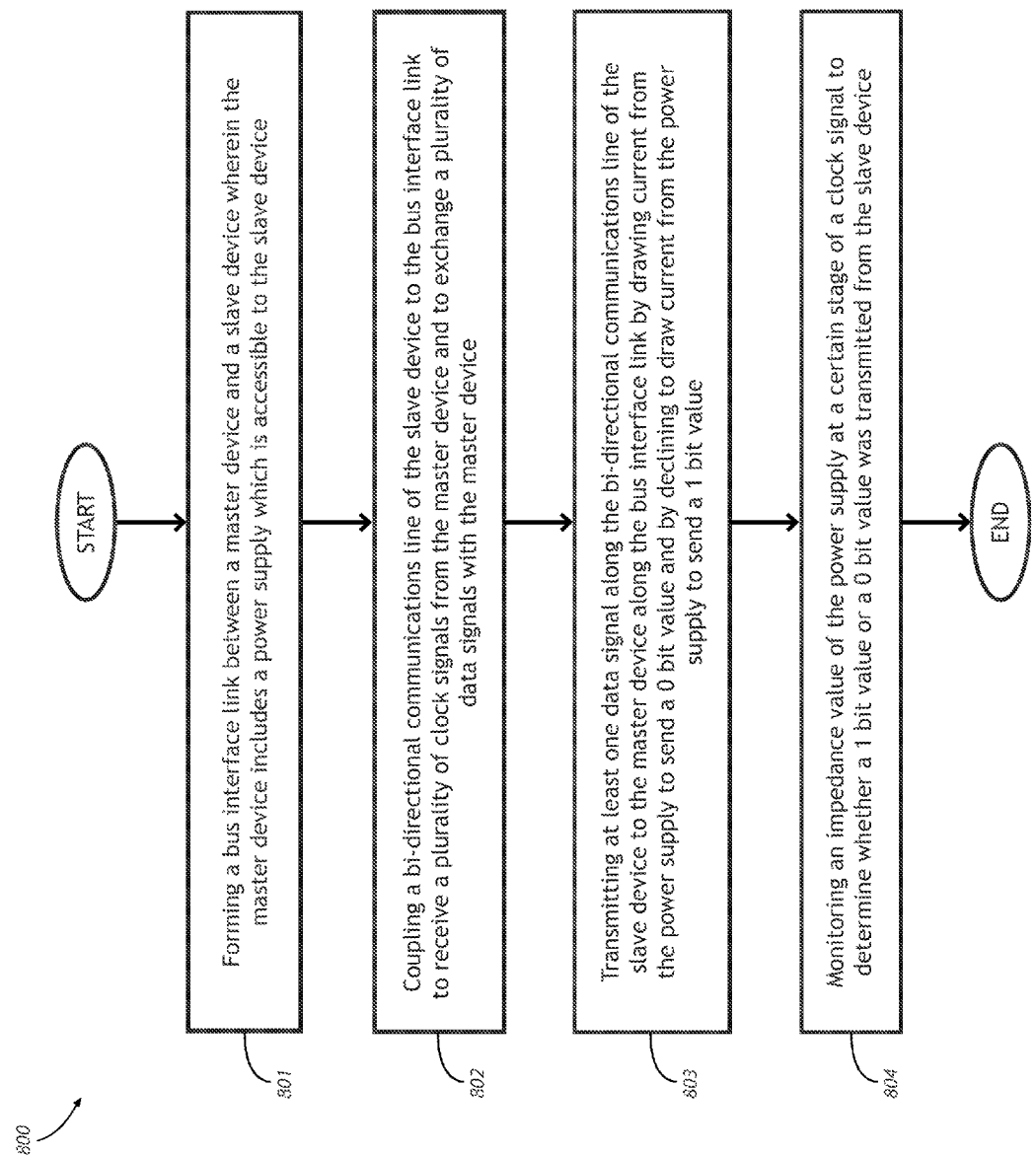

METHOD, APPARATUS, AND SYSTEM FOR IMPROVING INTER-CHIP AND SINGLE-WIRE COMMUNICATION FOR A SERIAL INTERFACE

FIELD

This disclosure pertains to computing system, and in particular (but not exclusively) to inter-chip communication.

BRIEF DESCRIPTION OF THE DRAWINGS

FIG. 8 illustrates an embodiment of a method consistent with the present disclosure.

DETAILED DESCRIPTION

Figure 1:
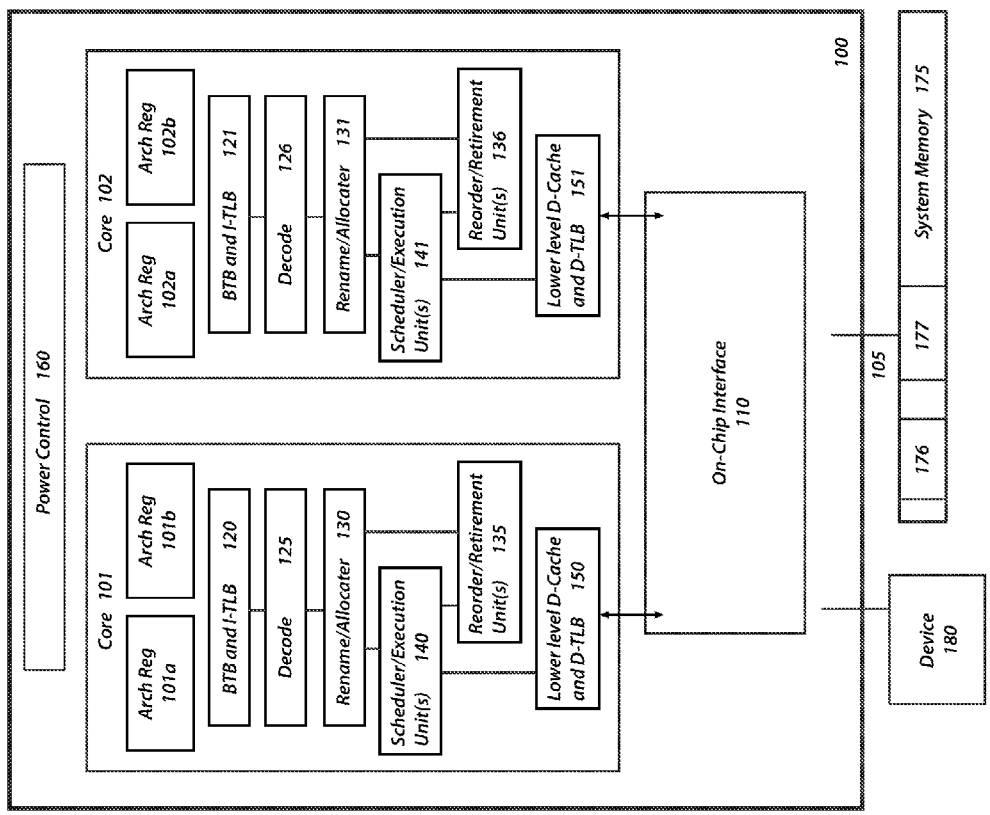
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
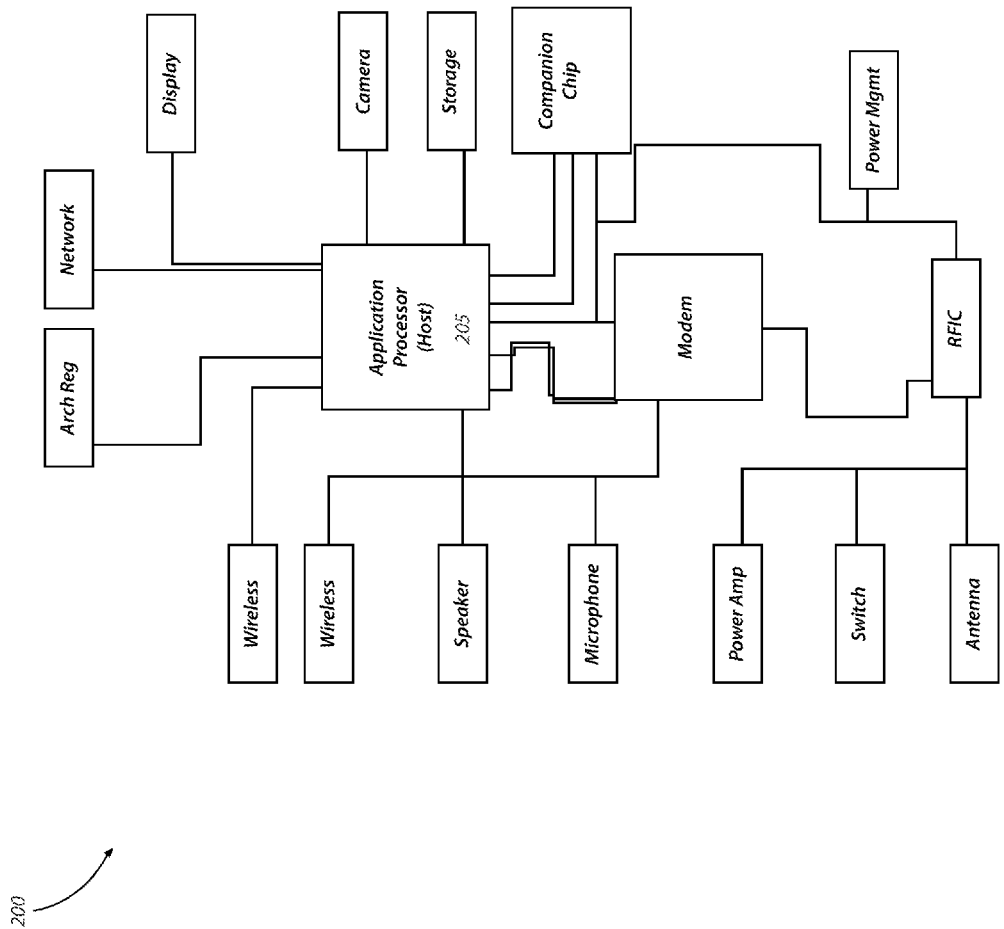
FIG. 2 illustrates an embodiment of a low power computing platform.

Referring to FIG. 2, an embodiment of a low power computing platform is depicted. In one embodiment, low power computing platform 200 includes a user endpoint, such as a phone, smartphone, tablet, ultraportable notebook, a notebook, a desktop, a server, a transmitting device, a receiving device, or any other known or available computing platform. The illustrated platform depicts a number of different interconnects to couple multiple different devices. Exemplary discussion of these interconnect are provided below to provide options on implementation and inclusion.

However, a low power platform 200 is not required to include or implement the depicted interconnects or devices. Furthermore, other devices and interconnect structures that are not specifically shown may be included.

Starting at the center of the diagram, platform 200 includes application processor 205. Often this includes a low power processor, which may be a version of a processor configuration described herein or known in the industry. As one example, processor 200 is implemented as a system on a chip (SoC). As a specific illustrative example, processor 200 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor.

Serial interfaces are used for control and communication between integrated circuits (IC's) and devices in electronic equipment. Many integrated circuits and devices in electronic equipment have high pin-count which is a significant cost adder for components and circuit boards. For example, serial interfaces between IC's in conventional mobile telephone feature two wires per interface. Notably, conventional mobile telephones include clock and bi-directional data pins, possibly with the addition of chip enable a bus-specific power supply pin. MIPI RFFE and I2C standard protocols, for example, provide two wires per interface.

In fact, some digital microphone interfaces require four connections to the microphone—power, ground, clock, and data. As such, present digital microphone interface technology is a regression from the analog interface which features a two pin connection for ground and power/signal.

The present disclosure provides a single wire bi-directional interface capable of full-duplex operation at high data bit rates (e.g., MB/s bit-rates). In addition, the present disclosure enables implementing digital microphones using two physical pins. Furthermore, the present disclosure provides an embodiment which enables two identical microphones to be attached to the same bus interface link for noise cancellation. Advantageously, a master device and receiver slave device disclosed herein may be implemented, at least in part, within other devices such as, but not limited to, digital microphones, personal computers, televisions, track pads, computer mice, GPS receivers, SIM card readers, blue tooth connectors and the like.

Figure 3:
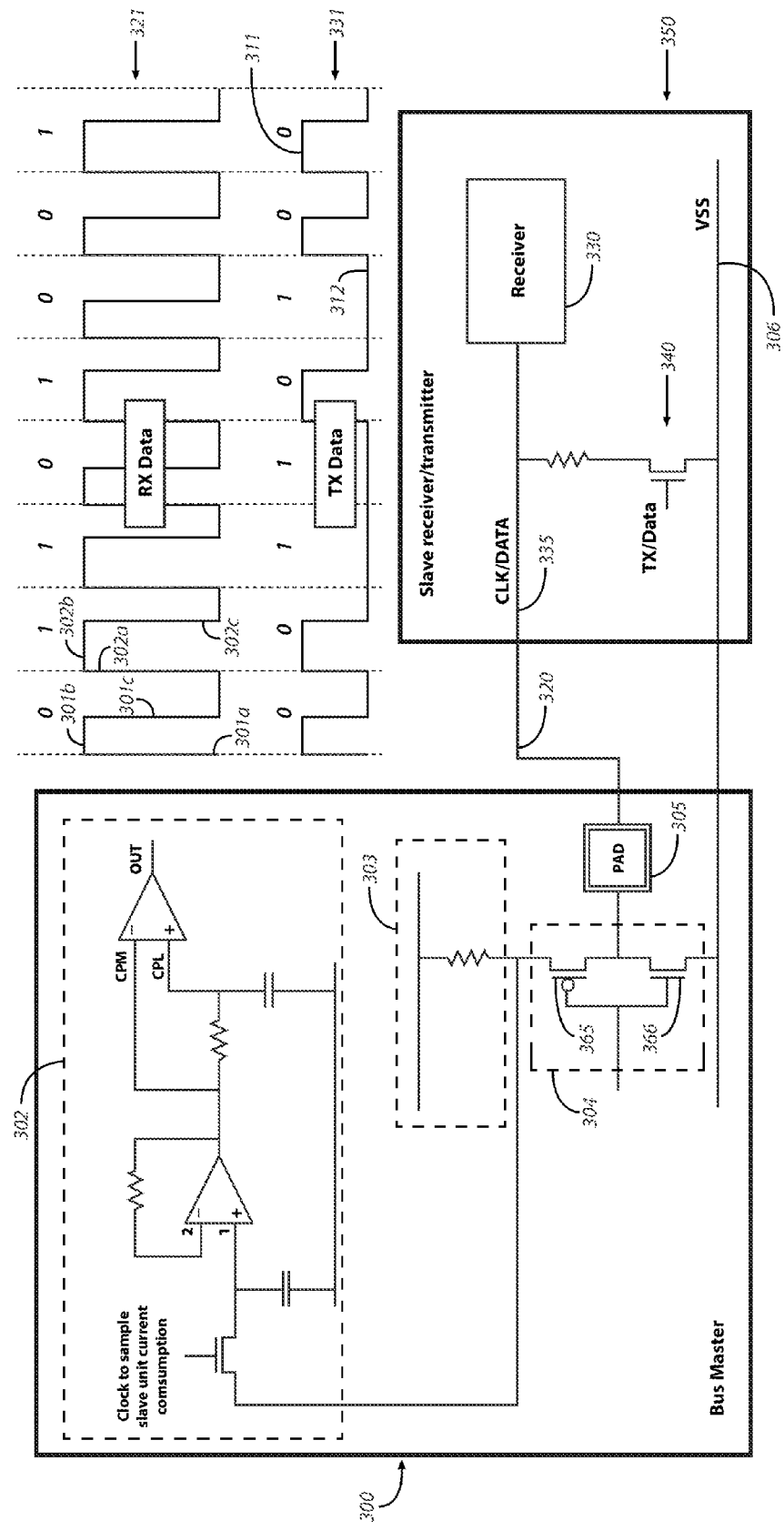
FIG. 3 illustrates an embodiment of a bus master coupled to a receiver, both consistent with the present disclosure.

FIG. 3 illustrates an embodiment of a bus master 300 coupled to a digital microphone 350, both consistent with the present disclosure. However, neither device nor their components are required to practice the present disclosure. As shown, bus master 300 is coupled to digital microphone 350 via bus interface 320. In some embodiments, bus master 300 and digital microphone 350, shown in FIG. 3 are both components in a mobile telephone (also referred to in some embodiments as a user endpoint (UE) with voice communication capability). More specifically, both bus master 300 and digital microphone 350 are components of a digital microphone in accordance with some embodiments of the present disclosure.

In some embodiments, a bus master consistent with the present disclosure (e.g., bus master 300) may include a receiver and antenna (neither shown) which receives audio data from a slave receiver device (e.g., digital microphone 350), processes the received data, and transmits the audio data (e.g., in the form of radio waves) to a receiver in another device.

In some embodiments, bus master 300 continuously transmits (e.g., downlinking) data in the form of clock signals to digital microphone 350 in the form of encoded symbols to maintain synchronization between each device. In addition, digital microphone 350 may continuously send data (e.g., audio data) to bus master 300.

One having ordinary skill in the art may appreciate that digital microphone 350 may receive audio signals which may strike and cause an element (e.g., such as a diaphragm) therein to vibrate. The vibrations may be converted to electrical signals according to a sampling frequency.

For example, a digital microphone consistent with the present disclosure may sample audio data (e.g., speech) in accordance with conventional sampling frequencies such as 20 kHz, 44 kHz, 48 kHz, and 96 kHz.

Moreover, a digital microphone or other slave receiver device consistent with the present disclosure may perform an action according to command(s) issued by a bus master which may require the digital microphones to send data back to the bus master device.

Bus master 300 may enable communication directly with other components (e.g. slaves) which may be under command of the CPU. Further, bus master 300 may control the bus interface link 320 on which address, control, and data signals flow. In some embodiments, digital microphone 350 is a slave unit of bus master 300. Advantageously, bus mastering may increase the operating system's data transfer rate, conserves system resources and boosts performance and response time.

In some embodiments of the present disclosure, bus master 300 creates wide and narrow clock pulses and transmits these clock pulses to the slave device—digital microphone 350 across a bus interface link 320. In addition, bus master 300 may have an internal clock which has a higher frequency than the frequency along the bus interface link 320. In particular, in some embodiments, the frequency of the internal clock of bus master 300 is an integer number greater (e.g., 10) than the frequency along the bus interface link 320.

For example, if a bus master clock has a frequency of 100 Mhz, the frequency along the bus interface link 320 may be 10 Mhz. As such, according to this example, the bus master clock may generate ten clock cycles for each clock cycle propagated along the bus interface link 320 (e.g., BUSCLK). Bus master 300 may contain an internal state machine to generate the BUSCLK signal based on the data to transmit.

In some embodiments, an output driver may drive the BUSCLK line high and low, respectively. In addition, a clock voltage may be Vcc for high and Vss for low as will be described in more detail below (see FIG. 6).

To create a narrow clock pulse, bus master 300 may direct the BUSCLK to go high for a brief time and then have the BUSCLK go low for a longer period of time. For example, BUSCLK may be directed to go high for 3 clock cycles and then go low for 7 clock cycles.

Alternatively, to create a wide clock pulse, bus master 300 may direct the BUSCKLK to go high for an extended period of clock cycles (e.g., 7 clock cycles) and then directed to go low for a brief period of clock cycles (e.g., 3 clock cycles).

Furthermore, in some embodiments, for each 10 BUSCLK cycles, 10 bits of data may be transmitted to a receiver slave unit (e.g., digital microphone 350) which corresponds to one 8b/10b symbol. In time, the 8b/10b symbol may be decoded by a 8b/10b decoder in the receiver slave unit. The transmitted 8b/10b symbols may include comma, data, or command symbols according to the 8b/10b coding protocol.

One having ordinary skill in the art may appreciate that the present disclosure is not limited to 8b/10b coding protocol. As such, other coding protocols may be utilized which allow bus master 300 to transmit data, commands, or the like to a slave receiver (e.g., digital microphone 350).

As shown in the figure, bus master 300 includes a detection unit 302 which provides circuitry to detect whether bus master 300 receives a 1 or 0 during uplink from a slave digital microphone 350. In some embodiments, the clock frequency within detection unit 302 may be much higher than the frequency along the bus interface 320. For example, the clock frequency within detection unit 302 may be approximately up to ten times greater than the clock frequency along the bus interface 320. Bus master 300 further includes a power source 303 which is accessible to digital microphone 350.

In addition, bus master 300 includes a CMOS inverter 304 which is coupled to power source 303 and ground 306 (Vss). Furthermore, bus master 300 includes a PAD 305 which allows the integrated circuit which comprises the bus master 300 to connect to external devices.

In some embodiments, CMOS inverter 304 includes a PMOS transistor 365 and a NMOS transistor 366 therein. Typically, the PMOS and NMOS transistors 365, 366 within the CMOS inverter 304 are complimentary such that when one transistor is on, the other transistor is off.

As further shown in FIG. 3, the PMOS transistor 365 is coupled to power supply 303 such that when a voltage or current is applied thereto, power is released to charge PAD 305. Alternatively, NMOS transistor 366 is coupled to ground such that when a voltage or current is applied thereto, PAD 305 is discharged to ground.

In some embodiments, when a clock signal within bus master 300 is high, the PMOS transistor 365 connects PAD 305 to power supply 303 whereas when the clock signal is low, NMOS transistor 366 connects PAD 305 to ground line 306.

Digital microphone 350 may include a bi-directional communications wire 335 which allows clock data signals to be received and data signals to be transmitted therefrom. As shown, bi-directional communications wire 335 receives clock data signals during downlink and transmits data during uplink.

During downlink, bus master 300 may transmit clock data signals to the digital microphone 350. In some embodiments, the data signals are transmitted in the form of clock pulses as shown by clock pulse train 321. As shown, clock pulse train 321 includes a plurality of narrow and wide clock pulses 301, 302.

In some embodiments, a receiver component 330 of digital microphone 350 may detect whether a 1 or 0 bit value is transmitted from bus master 300 as will be described in more detail below.

During uplink, digital microphone 350 may transmit data by drawing or declining from drawing current from the power source 303 on the bus master 300. In some embodiments, the detection unit 302 detects whether power is drawn from digital microphone 350 during the falling edge of each clock cycle. In some embodiments, detection unit 302 may detect a difference in the impedance within the power source 303.

Furthermore, digital microphone 350 may transmit a 1 during uplink to bus master 300 by declining to draw current from power source 303. As such, transmission data train 331 illustrates the low output signal 312 which is indicative of neither power (e.g., low power) nor current drawing from the power source 303.

Alternatively, digital microphone 350 transmits a 0 during uplink to bus master 300 by drawing current from power source 303. In some embodiments, detection unit 302 detects whether the digital microphone 350 is drawing current from power source 303 during the falling edge of each clock cycle. As such, transmission data train 331 illustrates the high output signal 311 which is indicative of power or current drawn from power source.

In order words, when digital microphone 350 transmits a 0 during uplink, transistor 340 provides a conduit from power supply 303 on the bus master 300 to ground line 306. In some embodiments, while current is drawn from the power supply 303 to the digital microphone 350, detection unit 302 detects low impedance.

In contrast, when digital microphone 350 transmits a 1 during uplink, transistor 340 blocks electrical access from power supply 303 to the ground line 306. As such, when current is not being drawn, detection unit 302 may detect high impedance.

As such, the process of uplinking data from a slave receiver (e.g., digital microphone 350) to a bus master (e.g., bus master 300), as described herein, may be characterized as impedance or amplitude shift keying according to some embodiments of the present disclosure. In addition, the process of downlinking data from a bus master to a slave receiver, in the manner described herein, may be characterized as phase shift keying.

Figure 4:
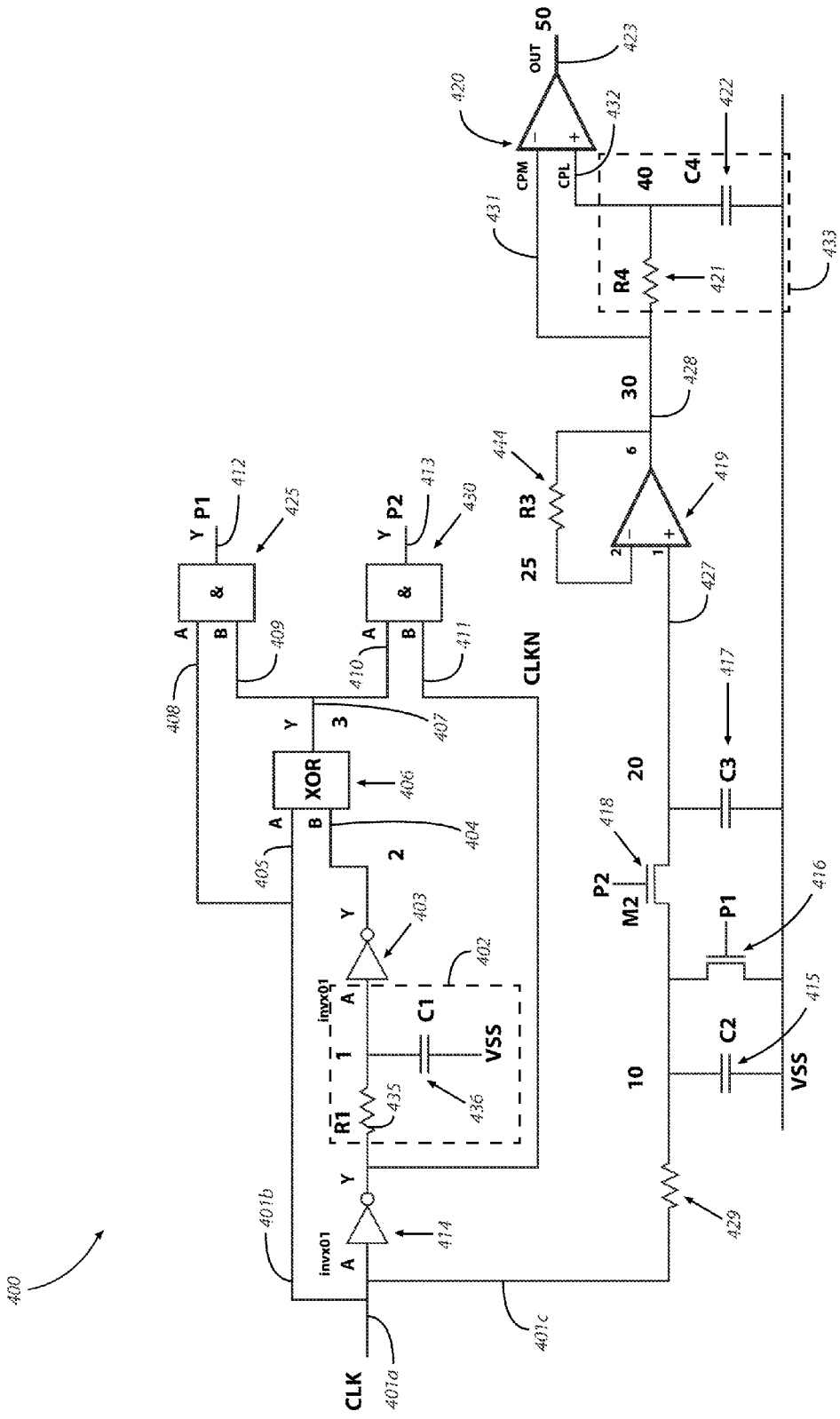
FIG. 4 illustrates an embodiment of a receiver consistent with the present disclosure.

FIG. 4 illustrates an embodiment of a receiver 400 consistent with the present disclosure. The receiver 400 may be implemented within the digital microphone 350 shown in FIG. 3. In some embodiments, receiver 400 receives an encoded data stream from a master device such as a bus master. For example, the data stream received may be 8b/10b encoded.

As shown, a clock data signal is input into digital microphone 400 which is propagated to paths (wires) 401a, 401b, and 401c. For example, clock data signals may be propagated along the path 401b to become an input 405 to an XOR gate 406 and an input into AND gate 425 (along path 408). Further, an output 412 of AND gate 425 is applied to transistor 416 (M1) as will be described in more detail below.

In addition, output 407 of XOR gate 406 is inputted into AND gates 425, 430 (via paths 409, 410) which in part determines the polarity of each clock pulse applied to transistors 416, 418.

In addition, receiver 400 provides a path to transmit clock data signals to a second input 404 of XOR gate 406. Most notably, the aforementioned path includes two inverters 403, 414 and a delay element 402. The inverters 403, 414 and delay element 402 delays clock signals propagated within the receiver 400.

As shown, delay element 402 includes a resistor 435 and a capacitor 436. In some embodiments, the amount of delay depends upon the size of the resistor 435 and capacitor 436. For example, resistor 435 may have a resistance of 200 kΩ and capacitor 436 may have a capacitance of $100 \times 10^{-15}$ (fempto) farads.

In some embodiments, the inverters 403, 414 and delay element 402 cause the clock pulse (P1) propagated from output 412 to occur before a clock pulse (P2) is propagated from output 413. For example, the P1 clock pulse may be dispatched on the rising edge of a clock signal whereas the P2 clock pulse may be dispatched on the falling edge of a clock cycle (or signal) in accordance with some embodiments of the present disclosure.

Further, path 401a propagates clock signal through inverter 414, which inverts clock signals and transmits the signals to input 411 of AND gate 430. The output of AND gate 430 is propagated to transistor 418. Finally, path 401c provides a path for clock signals to propagate to the bottom half of the receiver circuitry 400 as shown.

In some embodiments, upon the rising edge of a clock signal, the output 412 of AND gate 425 propagates a short clock pulse (P1) to transistor 426 which will turn on the transistor 426 and will subsequently discharge the C2 capacitor 415. In addition, once the short P1 pulse transpires, the C2 capacitor 415 will begin to charge through the R2 resistor 429.

In some embodiments, the R2 resistor 429 has a resistance of 10 MΩ. Further, C2 capacitor 415 has a capacitance of 100×10^-15 farads. Likewise, both transistors 416, 418 are NMOS transistors with a length of approximately 180 nm and a width of approximately 500 nm.

In addition, on the falling edge of a clock cycle, a short P2 clock pulse discharges a portion of the C2 capacitor 415 such that the voltage therein is copied on or sampled to the C3 capacitor 417. As such, a P2 clock pulse causes the C2 capacitor 415 and the C3 capacitor 417 to have the same voltage.

In other words, when the P2 clock pulse is high, the C2 capacitor 415 voltage is copied on to the C3 capacitor 417. In contrast, when the P2 clock pulse is low, the voltage on the C3 capacitor 417 is compared with an average voltage across the C3 capacitor 417 in previous clock cycles as will be described in more detail below.

Furthermore, when the P2 clock pulse is low, the C2 capacitor 415 will continue to discharge until the rising edge of a clock signal causes the C2 capacitor 415 to recharge. In some embodiments, the size of the C2 capacitor 415 may be much larger than the size of the C3 capacitor 417. For example, the size of the C2 capacitor 415 may be approximately ten times larger than the size of the C3 capacitor 417. For instance, the capacitance of the C2 capacitor 415 is 100×10^-15 farads whereas the capacitance of the C3 capacitor 417 is approximately 10×10^-15 farads.

Further, once a voltage is copied on the C3 capacitor 417, this voltage may be propagated to the output 428 of operational amplifier 419 (opamp 419). Advantageously, the voltage of the C3 capacitor 417 can be applied to an input 427 of the opamp 419.

In some embodiments, the opamp 419 may have a characteristic high-input impedance. For instance, the resistance of resistor 444 of opamp 419 may be as large as 1 GΩ. Accordingly, opamp 419 may function as an ideal operational amplifier such that the C3 voltage applied to the input 427 (Vin) is propagated to the output 428 of the opamp 419 (Vout).

As further illustrated, the voltage at the output 428 is propagated to a first input 431 of operational amplifier 420. Most notably, the average C3 voltage of previous clock cycles may be stored in the C4 capacitor 422 of the low pass filter 433.

The average voltage stored in the low pass filter 433 may be a function of the size of the resistor and capacitor components 421, 422 within the filter 433. As such, a low pass filter 433 may be designed according to a RC time constant which may be defined as the amount of time required to charge a capacitive component (C4 capacitor 422) across a resistive component (resistor 421) to about 63% of its final value. Therefore, the larger the RC time constant, the more C3 capacitor voltage cycles can be accounted into the average C3 capacitor voltage (i.e., voltage on C4 capacitor). In some embodiments, resistor 421 may be 30, 40, or 100 MΩ whereas C4 capacitor 422 may be 100×10^-15 farads.

Accordingly, once the C3 capacitive voltage is propagated to the first input 431 and the average voltage (C4 capacitor 422) is applied to the second input 432, the opamp 420 performs a comparison. Afterwards, the opamp 420 generates a 1 or 0 output. In some embodiments, when the present C3 capacitive voltage is greater than the average voltage (e.g., C4 capacitive voltage), then opamp 420 outputs a 1. In contrast, when the present C3 capacitive voltage is less than the average voltage, then opamp subsequently outputs a 0.

On having ordinary skill in the art should appreciate that a series of 1's and 0's may be decoded (e.g., from an 8b/10b encoding scheme) to carryout various commands in accordance with messages such as commands sent from a bus master. For example, the decoded commands may include, but are not limited to, programming the gain in the digital microphone during uplink or setting the amount of current drawn when transmitting a 0 to the bus master from a slave device.

Figure 5:
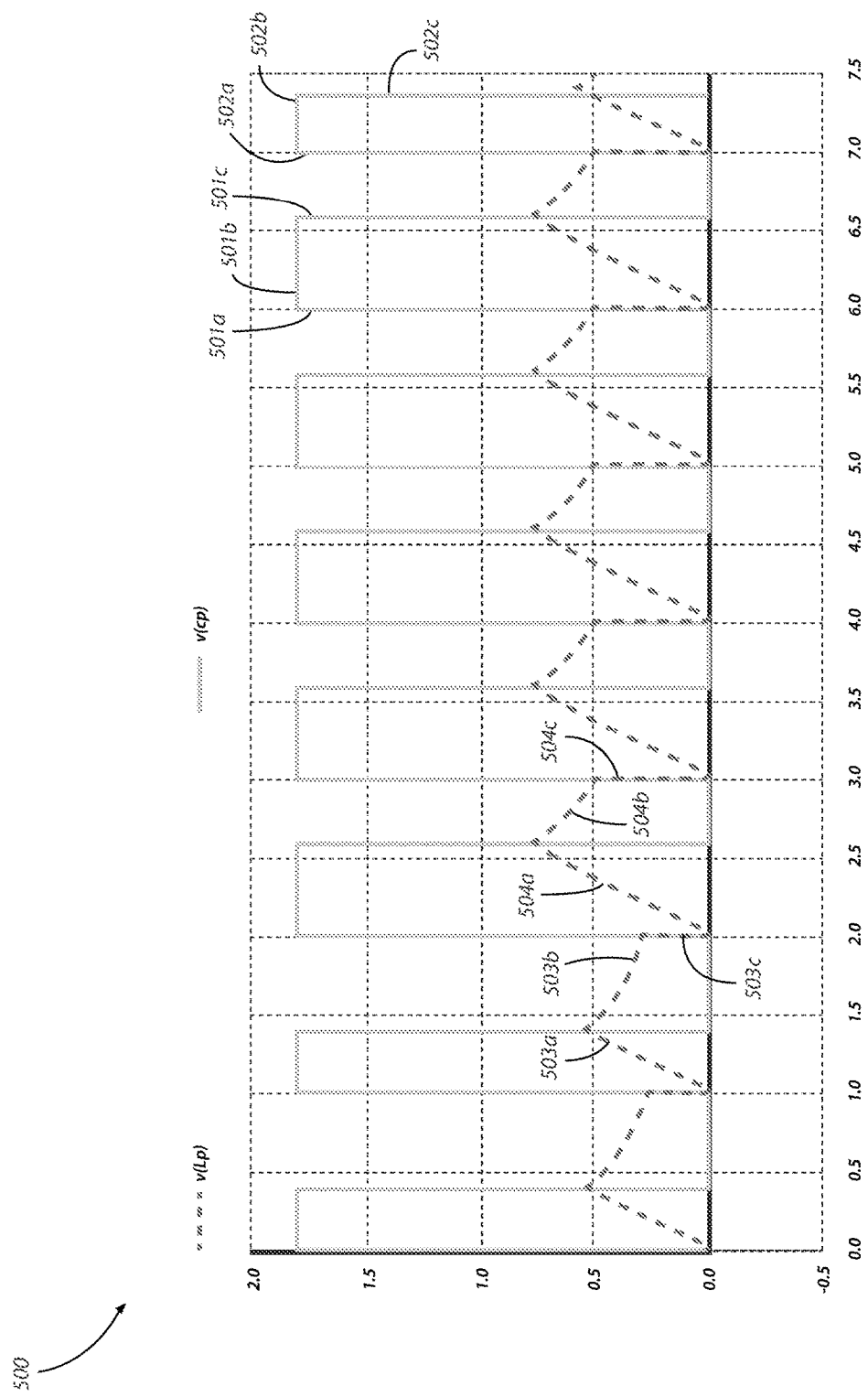
FIG. 5 illustrates a graph displaying how the voltage of a capacitor changes within the receiver consistent with the present disclosure as a function of the various clock pulses of a clock pulse train.

FIG. 5 illustrates a graph 500 displaying how the voltage of the C2 capacitor changes within a receiver consistent with the present disclosure as a function of the various clock pulses 501, 502 of a clock pulse train.

Notably, each wide clock pulse 501 represents a 1 whereas each narrow pulse 502 represents a 0. Each wide clock pulse 501 includes a rising edge 501a, high state 501b and falling edge 501c. Likewise, each narrow pulse 502 includes a rising edge 502a, high state 502b and falling edge 502c.

Now referring to FIG. 4 and FIG. 5, on the rising edge of a clock signal (e.g., 501a or 502a of FIG. 5), a short P1 clock pulse is applied to transistor 416 (FIG. 4) and discharges the C2 capacitor 415 through transistor 416.

In addition, once the P1 pulse subsides and the clock signal remains at a high state (501b or 502b), the C2 capacitor 415 is charged through the resistor 429. Alternatively, on the falling edge of a clock cycle (e.g., 501c or 502c), a short P2 clock pulse is applied to the transistor 418 such that the voltage of the C2 capacitor 415 is sampled on to the C3 capacitor 417.

FIG. 5 further shows how the voltage of the C2 capacitor 415 changes as the as the clock pulse train varies from wide clock pulses 501 to narrow clock pulses 502 and so on. As shown, at time 0.0, the clock signal is at a rising edge state and therefore the voltage at C2 capacitor 415 is 0V because the capacitor is discharged.

However, once the clock signal reaches the high state (501b or 502b), the C2 capacitor 415 begins to charge through resistor 429 as indicated by voltage rises 503a, 504a in the figure. Eventually, the clock signal will reach its falling edge (501c or 502c) and the voltage on the C2 capacitor 415 will be copied on to the C3 capacitor 417.

In some embodiments, when the voltage on the C2 capacitor 415 is sampled on to the C3 capacitor 417, the voltages on both capacitors are approximately the same. Accordingly, the decrease in voltage on the C2 capacitor 415 is shown by voltage falls 503b, 504b. The clock cycle repeats again with a rising edge (503c, 504c) which causes the C2 capacitor 415 to discharge as shown in FIG. 5.

Figure 6:
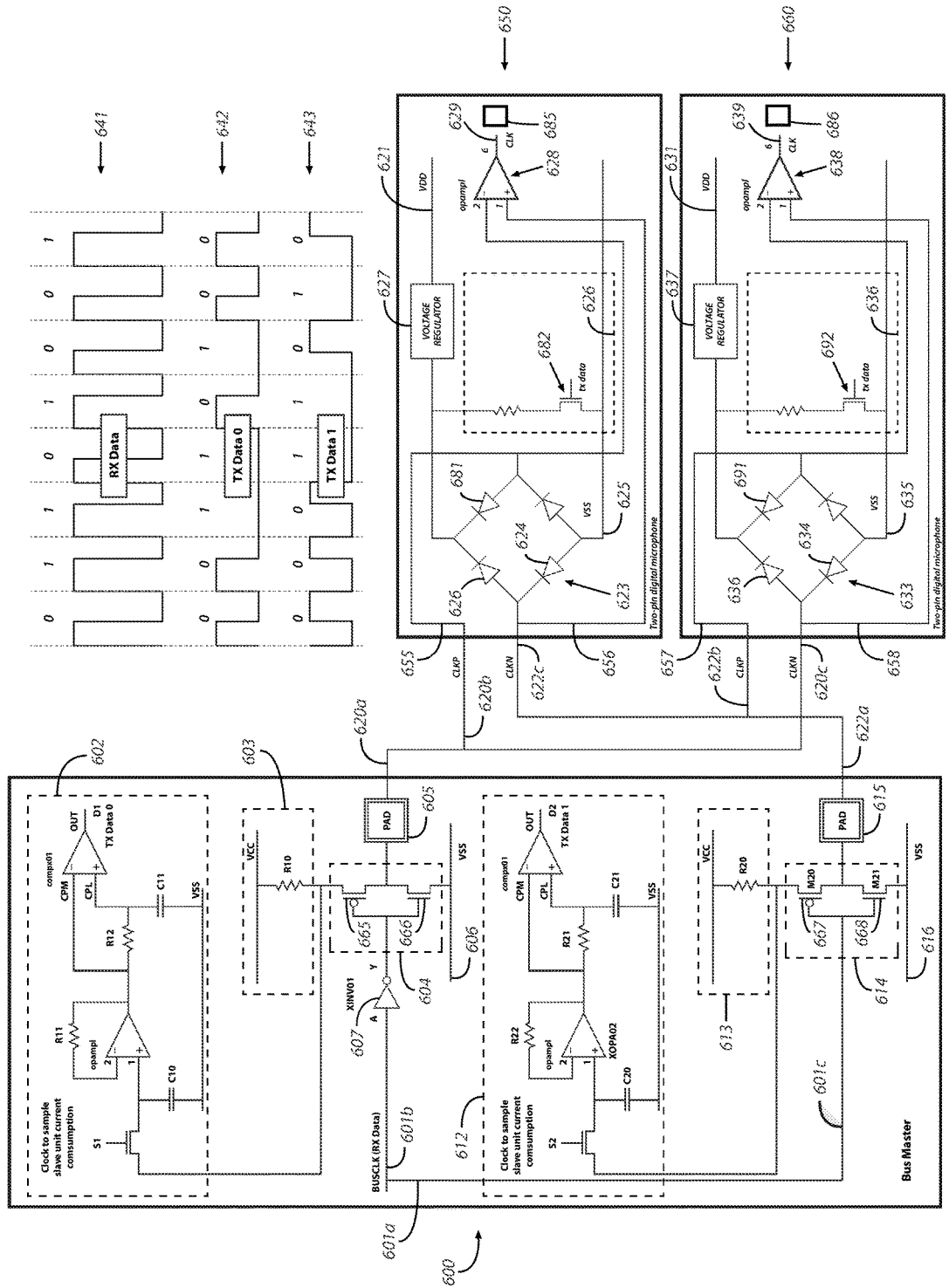
FIG. 6 illustrates a bus master coupled to multiple digital microphones having circuitry consistent with the present disclosure.

Continuing on through the figures, FIG. 6 illustrates a bus master 600 coupled to multiple digital microphones 650, 660 having circuitry consistent with the present disclosure. As shown, bus master 600 contains circuitry to support data exchange with two digital microphones 650, 660. One having ordinary skill in the art may appreciate that multiple digital microphones within a telecommunications device may be useful for noise cancellation. Most notably, the system shown in FIG. 6 is configured such that only two pin connections are needed between bus master 600 and the two digital microphones 650, 660.

As illustrated, bus master 600 contains two detection units 602, 612. Detection units 602, 612 collectively provide circuitry to detect whether bus master 600 receives a 1 or 0 during uplink from slave digital microphones 650, 660. In some embodiments, digital microphones 650, 660 uplink their data to bus master 600 at certain stages of a clock signal. For instance, one of the digital microphones 650, 660 may uplink data on a rising edge of a clock signal whereas the other digital microphone may uplink data on a falling edge of a clock cycle.

Furthermore, the clock frequency within detection units 602, 612 may be much higher than the frequency along bus interface links 620a, 622a. For example, the clock frequency within detection units 602, 612 may be approximately up to ten times greater than the clock frequency along the bus interface 620a, 622a.

In addition, bus master 600 further includes two power sources 603, 613 which may be accessible to digital microphones 650, 660. In some embodiments, digital microphones 650, 660 draws current from either power source 603, 613 to transmit a 0 bit value and declines from drawing current from either power source 603, 613 to transmit a 1 bit value.

Initially, a plurality of clock signals may be received by bus master 600 from a crystal oscillator, PLL, or DLL. Based on these clock signals and the data, bus master 600 should transmit to the slave devices a state machine in the bus master 600 which may generate a BUSCLK signal to be applied to the input connection 601.

The BUSCLK signal may comprise wide and narrow pulses encoded so on average, an equal number of wide and narrow pulses are transmitted in a given interval. In some embodiments, the encoding is 8b/10b encoding. However in yet another embodiment, the encoding is DC-free coding. The generated clock signal may be propagated to each sub-unit of the bus master 600 via paths 601a and 601b.

The received clock signals may be propagated to each sub-unit of the bus master 600 via paths 601a and 601b. In particular, the clock signals may be sent to CMOS inverter 604 along path 601a whereas the clock signals may be sent to CMOS inverter 614 along path 601b. As shown, CMOS inverters 604, 614 are coupled to power sources 603, 613 and ground connections 606, 616, respectively (Vss).

In some embodiments, each CMOS inverter 604, 614 includes PMOS (665, 667) and NMOS (666, 668) transistors therein. Typically, the PMOS and NMOS transistors within the CMOS inverters 604, 614 are complimentary such that when one transistor is on, the other transistor is off.

As further shown in FIG. 6, the PMOS transistors 665, 667 are coupled to power supplies 603, 613 such that when a voltage or current is applied thereto, power is released to charge PADS 605, 615. Alternatively, NMOS transistors 666, 668 are coupled to ground such that when a voltage or current is applied thereto, PADS 605, 615 are discharged to ground.

For example, when a clock signal within bus master 600 is high, the PMOS transistor 667 connects PAD 615 to power supply 613 whereas when the clock signal is low, NMOS transistor 668 connects PAD 615 to ground line 616.

In addition, when a clock signal within bus master 600 is high, inverter 607 may invert the clock signal such that the PMOS transistor 665 connects PAD 605 to power supply 603. Alternatively, a low clock signal is inverted such that the NMOS transistor 666 connects PAD 605 to ground line 606.

Therefore, in some embodiments of the present disclosure, clock data signals may be transmitted to digital microphone 650 on the rising edge of a clock signal whereas clock data signals may be transmitted to digital microphone 660 on the falling edge of a clock cycle. Thus, when CLKP signal is high, the CLKN signal is low.

In particular, during uplink, current may flow from CLKP to CLKN on the rising edge of the BUSCLK signal and from CLKN to CLKP on the falling edge. Furthermore, the transistor (coupled to Vdd) within digital microphone 660 may conduct during the rising edge of the BUSCLK signal whereas the transistor (coupled to Vdd) within digital microphone 650 may conduct during the falling edge of the BUSCLK signal. Moreover, a sampling circuit on the CLKP of bus master 600 may sample on an early BUSCLK cycle (e.g., cycle 1) whereas a sampling circuit on CLKN may sample on a later BUSCLK cycle (e.g., cycle 8).

Furthermore, PADS 605, 615 allow the bus master 600 and an integrated circuit that the bus master 600 is disposed on to connect to external devices. PADS 605, 615 may be connected to each bi-directional communications line within the digital microphones 650, 660 via bus interface links 620a, 622a.

In addition, bus interface link 620a may provide an input for CLKP along path 620b to bi-directional communications line 655 within digital microphone 650. Additionally, bus interface link 620a may provide an input for CLKN along path 620c to bi-directional communications line 658 within digital microphone 660.

In addition, bus interface link 622a may provide an input for CLKP along path 622b to bi-directional communications line 657 within digital microphone 660 and an input for CLKN along path 622c to bi-directional communications line 656.

Accordingly, digital microphones 650, 660 may include bi-directional communications wires 655, 666, 667, 668 which allow clock data signals to be received and data signals to be transmitted therefrom. In some embodiments, bi-directional communications wires 655, 666, 667, 668 receive clock signals during downlink and transmits data during uplink.

During uplink, digital microphones 650, 660 may transmit data by drawing current from the power sources 603, 613 on the bus master 600. In some embodiments, the detection units 602, 612 detect whether power is drawn from each digital microphone 650, 660. For instance, detection unit 602, 612 may detect a difference in the impedance within the power sources 603, 613.

In some embodiments of the present disclosure, when digital microphones 650, 660 transmit a 0 bit value during uplink, transistors 682, 692 provides a conduit from power supplies 603, 613 on the bus master 600 to ground lines 625, 635. Likewise, while current is drawn from power supplies 603, 613 to the digital microphones 650, 660, detection units 602, 612 detects low impedance.

In contrast, when digital microphones 650, 660 transmit a 1 bit value during uplink, transistors 682, 692 blocks electrical access from power supplies 603, 613 to ground lines 625, 635. As such, when current is not being drawn, detection units 602, 612 detect high impedance.

As such, the process of uplinking data from a slave receiver (e.g., digital microphones 650, 660) to a master device (e.g., bus master 600), as described herein, may be characterized as impedance or amplitude shift keying according to some embodiments of the present disclosure. In addition, the process of downlinking data from a bus master to a slave receiver, in the manner described herein, may be characterized as phase shift keying.

In some embodiments, bus interface links 620*a*, 622*a* are differential bus interfaces and digital microphones 650, 660 are differential receivers. In some embodiments, the differential digital microphone receivers 650, 660 may automatically detect the polarity of the differential clock signal.

In addition, digital microphones 650, 660 each have two pins such that CLKP is connected to a first pin on one digital microphone and CLKN is connected to a second pin on the other digital microphones. Accordingly, the two digital microphones 650, 660 may uplink data signals on the rising and falling edge of each clock cycle respectively.

In some embodiments, each digital microphone 650, 660 may uplink data when the clock signal is high. However, the inverter 607 on bus master 600 provides an inverse bus clock signal to CMOS inverter 604 such that digital microphones 650, 660 uplinks data in sequence.

As such, detection units 602 may determine what data is transmitted by the digital microphones 650, 660 when the inverted clock signal is high—which is a low bus clock signal. Alternatively, detection unit 612 may determine what data is transmitted by the digital microphones 650, 660 when the bus master clock signal is high.

In some embodiments, when CLKN is the most positive voltage within the digital microphones, Vss ground lines 625, 635 will be off because diodes 624, 634 (of rectifiers of 623, 633) may prevent current from flowing to each respective ground line 623, 633.

It should be understood to one having ordinary skill in the art that when CLKN is the most positive voltage in the digital microphones 650, 660, CLKP will be the most negative voltage within the digital microphones. Accordingly, because CLKN and CLKP changes polarity, "virtual ground" alternates from one pin of the digital microphone to the other pin of the other digital microphone.

As such, when CLKN is the most positive voltage within the digital microphones 650, 660, CLKN will charge Vdd lines 621, 631 via diodes 626, 636. In some embodiments, each digital microphone 650, 660 includes a voltage regulator 627, 637 to regulate the voltage within the microphones 650, 660.

Alternatively, when CLKP is the most positive voltage within the digital microphones 650, 660, CLKN will be the most negative voltage. CLKP will charge Vdd power rails 621, 631 via diodes 681, 691, respectively.

If the CLKN voltage is more negative than the voltage on ground lines 625, 635, current may flow from ground lines 625, 635 to CLKN such that ground lines 625, 635 will have the most negative voltage within each respective digital microphone 650, 660.

Therefore, rectifiers 623, 633 are configured such that the most positive voltage is coupled to Vdd power rails 621, 631. Rectifiers 623, 633 are also configured such that the most negative voltage is coupled to Vss ground lines 625, 635. As such, Vdd power rails 621, 631 will always be as high as the most positive voltage whereas Vss lines 625, 635 will always be as low as the most negative voltage.

Each bi-directional communications line is coupled to an input of an opamp 628, 638 within the digital microphones 650, 660. Opamps 628, 638 compare the voltage of CLKP and CLKN and outputs the voltage associated with CLKP according to some embodiments of the present disclosure. In yet some embodiments, each opamp 628, 638 has a high gain (e.g., 10 k) such that the outputs 685, 695 of the opamps 628, 638 will ideally be no higher than Vdd or no lower than Vss.

Opamps 628, 638 may be configured to transmit its output to a receiver 685, 686 consistent with the present disclosure. In some embodiments, receiver 685, 686 is consistent with the receiver 400 illustrated in FIG. 4.

Figure 7:
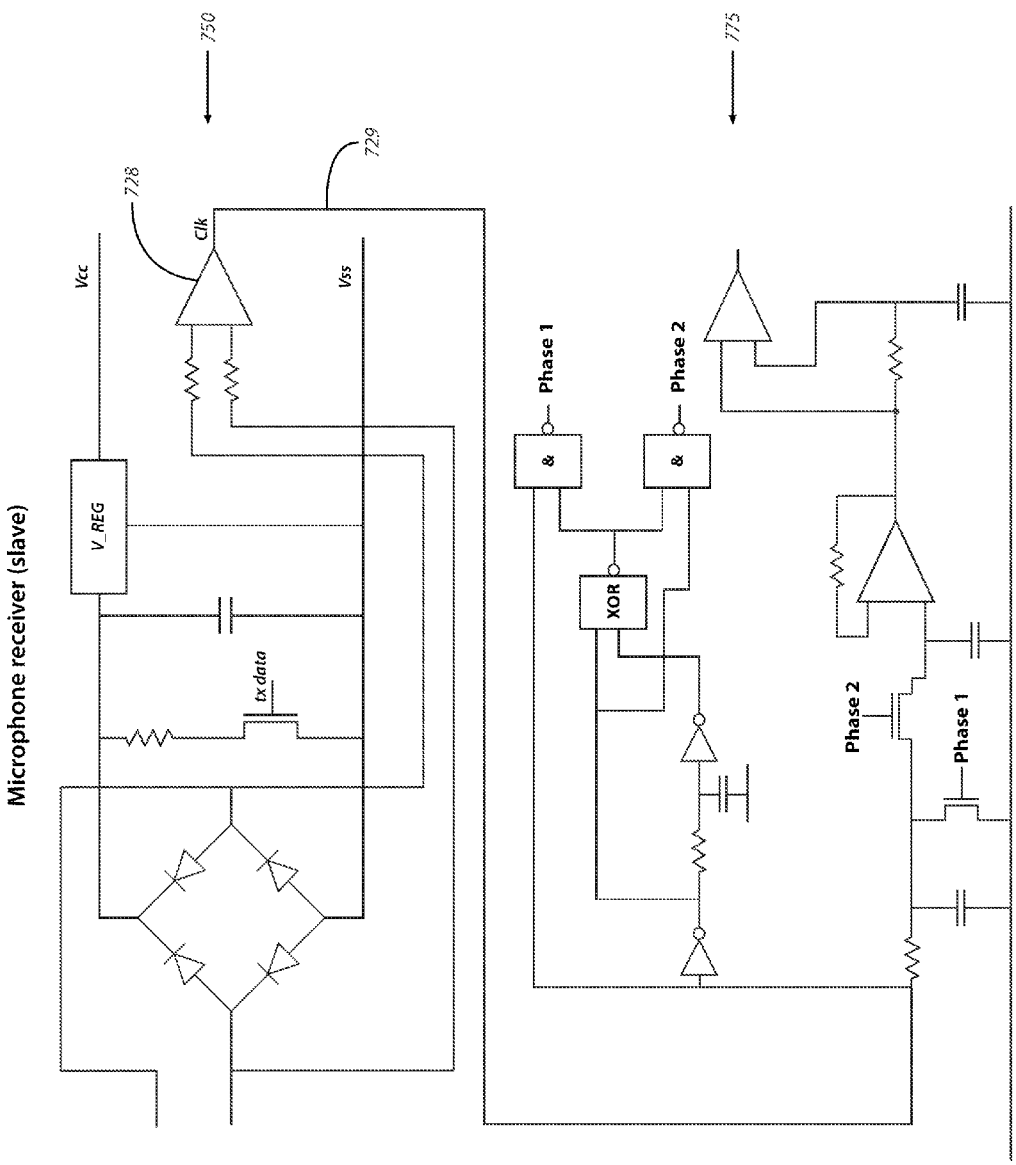
FIG. 7 illustrates an embodiment of a digital microphone coupled to a receiver consistent with the present disclosure.

FIG. 7 illustrates an embodiment of a digital microphone 750 coupled to a receiver 775 consistent with the present disclosure. Most notably, the output of operational amplifier 728 is transmitted via path 729 to receiver 775, a component of digital microphone 750.

Receiver 775 may be configured to detect a wide clock pulse and a narrow clock pulse transmitted by a bus master. In some embodiments, receiver 775 outputs a bit value of 1 for wide clock pulses and a bit value of 0 for narrow pulses. Afterwards, the bit values which may be 8b/10b encoded are subsequently decoded to determine a message (e.g., a symbol) transmitted from the bus master. For example, the decoded symbols may include a command for the digital microphone 750 to perform a certain action such as to increase or decrease the gain within the microphone 750.

FIG. 8 illustrates an embodiment of a method 800 consistent with the present disclosure. Method 800 may begin with block 801 which provides forming a bus interface link between a master device and a slave device wherein the master device includes a power supply which is accessible to the slave device. The master device may include a bus master. The slave device may include a digital microphone, GPS receiver, Bluetooth connector, SIM card reader, and may be implemented within personal computers, televisions, track pads, or computer mice.

Next, coupling a bi-directional communications line(s) of the slave device to the bus interface link to receive a plurality of clock signals from the master device and to exchange a plurality of data signals with the master device according to block 802. A bi-directional communications line consistent with the present disclosure enables a slave device to receive clock data signals from a master device in addition to enabling the slave device to transmit data signals back to the master device.

Furthermore, transmitting at least one data signal along the bi-directional communications line of the slave device to the master device along the bus interface link by drawing current from the power supply to send a 0 bit value and by declining to draw current from the power supply to send a 1 bit value according to block 803.

One having ordinary skill in the art may appreciate that the present disclosure is not limited to the aforementioned bit value assignment. For example, a system consistent with the present invention may configure the master and slave devices such that drawing current from a power source indicates a bit value of 1 whereas declining to draw current from a power source indicates a bit value of 0.

Next, according to block 804, monitoring an impedance value of the power supply at a certain stage of a clock signal to determine whether a 1 bit value or a 0 bit value was transmitted from the slave device. In some embodiments of the present disclosure, the use of an impedance or amplitude shift keying technique is utilized to detect a data signal transmitted by the slave device.

The following examples pertain to further embodiments. Specifics in the examples may be used anywhere in one or more embodiments. For instance, all optional features of the apparatus or system described herein may also be implemented with respect to the method or process described herein.

Example 1

A system, comprising: a master device, including: a power supply; a detection unit to detect an impedance of the power supply; an inverter to provide a first path to the power supply on a first stage of a clock signal and to provide a second path to a first ground line on a second stage of a clock signal; a bus interface link to couple the master device to a slave device. Furthermore, the slave device including: a bi-directional communications line to receive a plurality of narrow and wide clock pulses from the master device over the bus interface link; a gating component to provide a conductive path from the first path to the power supply through the bi-directional communications line to a second ground line; and a receiver to assign bit values associated with a plurality of narrow and wide clock pulses transmitted from the master device.

Example 2

The master device includes a bus master.

Example 3

The slave device includes a digital microphone.

Example 4

The inverter includes a CMOS inverter.

Example 5

The master device further comprises a bus clock.

Example 6

The gating component includes a transistor.

Example 7

The detection unit may detect a change in impedance of the power supply.

Example 8

The bi-directional communications line may propagate the plurality of narrow and wide clock pulses and current from the power supply concurrently.

Example 9

A portion of the assigned bit values is a command for slave device.

Example 10

A device, comprising: a rectifier coupled to be coupled to a ground line and a power rail, the rectifier to enable the ground line to discharge when a negative clock voltage is coupled to the rectifier and to enable the power rail to charge when a positive clock voltage is coupled to the rectifier; and a set of bi-directional communications lines to transmit data in response to a clock data signal.

Example 11

The device of further comprising a ground line and a power rail.

Example 12

The at least one of the set of bi-directional communications line is to uplink data by drawing changing an impedance of a power supply.

Example 13

At least one of the set of bi-directional communications line is to uplink data by declining from changing an impedance of a power supply.

Example 14

A receiver to assign a bit value to each received clock data signal.

Example 15

The rectifier is coupled to a bus interface link.

Example 16

The set of bi-directional communications lines is coupled to a gating element which may provide a path from a power source to a ground line within the slave device.

Example 17

A device, comprising: a first detection unit to detect a first impedance of a first power supply; a first inverter to provide a first path to the first power supply on a first stage of a clock signal and to provide a second path to a first ground line on a second stage of a clock signal; a second detection unit to detect a second impedance of a second power supply; a second inverter to provide a third path to the second power supply on the second stage of the clock signal and to provide a fourth path to a second ground line on the first stage of the clock signal; and a third inverter, the third inverter coupled to the first inverter to invert a clock signal inputted into the first inverter.

Example 18

The device previously described comprising a master clock.

Example 19

The first inverter and the second inverter each include a complementary set of transistors.

Example 20

The first electrical connection and a second electrical connection to transmit clock data signals to two slave devices.

Example 21

A clock to generate clock data signals.

Example 22

The device further comprising at least one of a receiver, antenna, or encoder.

Example 23

A method, comprising: forming a bus interface link between a master device and a slave device wherein the master device includes a power supply which is accessible to the slave device; coupling a bi-directional communications line of the slave device to the bus interface link; downlinking a plurality of clock data signals from the master device to the slave device through the bus interface link and the bi-directional communications line; and uplinking at least one data signal along the bi-directional communications line of the slave device to the master device along the bus interface link by drawing current from the power supply to send a first bit value and by declining to draw current from the power supply to send a second bit value.

Example 24

Monitoring an impedance value of the power supply to determine whether the first bit value or the second bit value was transmitted from the slave device.

Example 25

Monitoring an impedance value of the power supply at a falling edge of a clock signal.

Generating a plurality of clock pulses with varying widths by scaling down a clock frequency along the bus interface link from a clock frequency within the master device and setting a clock voltage high along the bus interface link for a period of clock cycles corresponding to a desired width for each clock pulse.

The slave device transmits the at least one data signal by drawing current from the master device on a rising edge of a clock signal.

The master device includes a bus master and the slave device includes a digital microphone.

Encoding the plurality of clock data signals according to an 8b/10b coding protocol.

The slave device draws current from the power supply by applying a threshold voltage to a transistor coupled between the power supply and a ground line such that the transistor provides a conductive pathway between the power supply and the ground line.

A device comprising: an integrated circuit (IC) configured to be coupled to a wire, the IC including Input/Output (I/O) logic to transmit to and receive information from the wire, wherein the I/O logic to transmit information to the wire comprises the I/O logic to transmit a first clock signal with a first duty cycle to represent a first data logic level and transmit the second clock signal with a second duty cycle, which is different from the first duty cycle, to represent a second data logic level.

The I/O logic to transmit information to the wire further comprises the I/O logic to provide 8b10b encoded data, wherein the 8b10b encoded data includes the first clock signal with the first duty cycle and the second clock signal with the second duty cycle.

The IC is to be coupled to a receiver device through the wire, the receiver device to include receiver I/O logic to receive the first clock signal and the second clock signal from the wire, to determine the first clock signal is to represent the first data logic level based on the first duty cycle, and to determine the second clock signal is to represent the second data logic level based on the second duty cycle.

The receiver device includes a first microphone, and wherein the IC further includes second I/O logic to couple to a second microphone through a second wire, wherein the second I/O logic is to vary a duty cycle of a clock signal to be transmitted on the second wire to the second microphone to represent data.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system, comprising:
   a master device, comprising:
   a first power supply;
   a first detection unit to detect an impedance of the first power supply;
   a first inverter to provide a first path to the first power supply on a first stage of a clock signal and to provide a second path to a first ground line on a second stage of a clock signal;
   a second power supply;
   a second detection unit to detect an impedance of the second power supply;
   a second inverter to provide a third path to a second ground line on a first stage of a clock signal and to provide a fourth path to the second power supply on a second stage of a clock signal;

a bus interface link to couple the master device to a first slave device and a second slave device, the first slave device comprising:
- a first bi-directional communications line to receive a plurality of narrow and wide clock pulses on a first stage of a clock signal from the master device over the bus interface link and to transmit a plurality of narrow and wide clock pulses on a second stage of a clock signal from the first slave device;
- a first gating component to provide a conductive path from the first path to the first power supply through the first bi-directional communications line to a second ground line; and
- a first receiver to assign bit values associated with a plurality of narrow and wide clock pulses transmitted from the master device; and the second slave device, comprising:
- a second bi-directional communications line to transmit a plurality of narrow and wide clock pulses on a first stage of a clock signal from the second slave device over the bus interface link and to receive a plurality of narrow and wide clock pulses on a second stage of a clock signal from the master device;
- a second gating component to provide a conductive path from the fourth path to the second power supply through the second bi-directional communications line to a second ground line; and
- a second receiver to assign bit values associated with a plurality of narrow and wide pulses transmitted from the master device,
- wherein the first slave device and the second slave device transmits data to the master device in sequence,
- wherein the first slave device and the second slave device receives data from the master device in sequence.

2. The system of claim 1, wherein the first slave device and the second slave device comprises a digital microphone.

3. The system of claim 1, wherein the inverter comprises a CMOS inverter.

4. The system of claim 1, wherein the master device further comprises a bus clock.

5. The system of claim 1, wherein the first gating component and the second gating component comprises a transistor.

6. The system of claim 1, wherein the first detection unit detects a change in impedance of the first power supply and the second detection unit detects a change in impedance of the second power supply.

7. The system of claim 1, wherein the first bi-directional communications line propagates the plurality of narrow and wide clock pulses and current from the first power supply concurrently,
wherein the second bi-directional communications line propagates the plurality of narrow and wide clock pulses and current from the second power supply concurrently.

8. The system of claim 1 wherein a portion of the assigned bit values is a command for a slave device.

9. A device, comprising:
a first detection unit to detect a first impedance of a first power supply;
wherein to detect the first impedance is to detect data from a first external device;
a first inverter to provide a first path to the first power supply on a first stage of a clock signal and to provide a second path to a first ground line on a second stage of a clock signal;
a second detection unit to detect a second impedance of a second power supply;
wherein to detect the second impedance is to detect data from a second external device;
a second inverter to provide a third path to the second power supply on the second stage of the clock signal and to provide a fourth path to a second ground line on a first stage of a clock signal; and
a third inverter coupled to the first inverter to invert a clock signal inputted into the first inverter,
wherein the device is to receive the data from the first external device and the second external device in sequence.

10. The device of claim 9 further comprising a master clock.

11. The device of claim 9, wherein the first inverter and the second inverter each comprise a complementary set of transistors.

12. The device of claim 9 further comprising a first electrical connection and a second electrical connection to transmit clock data signals to two slave devices.

13. The device of claim 9 further comprising a clock to generate clock data signals.

14. The device of claim 9 further comprising at least one of a receiver, an antenna, or an encoder.

15. A method, comprising:
forming a bus interface link between a master device, a first slave device, and a second slave device,
wherein the master device comprises a first power supply which is accessible to the first slave device and further comprises a second power supply which is accessible to the second slave device;
coupling a first bi-directional communications line of the first slave device to the bus interface link;
coupling a second bi-directional communications line of the second slave device to the bus interface link;
downlinking a plurality of clock data signals from the master device to the first slave device and the second slave device through the bus interface link, the first bi-directional communications line, and the second bi-directional communications line;
uplinking at least one data signal along the first bi-directional communications line of the first slave device to the master device along the bus interface link on a first stage of a clock signal by drawing current from the first power supply to send a first bit value and by declining to draw current from the first power supply to send a second bit value; and
uplinking at least one data signal along the second bi-directional communications line of the second slave device to the master device along the bus interface link on a second stage of a clock signal by drawing current from the second power supply to send the first bit value and by declining to draw current from the second power supply to send the second bit value,
wherein the first slave device and the second slave device uplinks data to the master device in sequence.

16. The method of claim 15 further comprising monitoring an impedance value of the first power supply to determine whether the first bit value or the second bit value was transmitted from the first slave device.

17. The method of claim 15 further comprising generating a plurality of clock pulses with varying widths by scaling down a clock frequency along the bus interface link from a clock frequency within the master device and setting a clock voltage high along the bus interface link for a period of clock cycles corresponding to a desired width for each clock pulse.

18. The method of claim 15, wherein the master device comprises a bus master and the first slave device, and wherein the second slave device comprises a digital microphone.

19. The method of claim 15 further comprising encoding the plurality of clock data signals according to an 8b/10b coding protocol.

20. The method of claim 15, wherein the first slave device draws current from the first power supply by applying a first threshold voltage to a first transistor coupled between the first power supply and a first ground line such that the first transistor provides a first conductive pathway between the first power supply and the first ground line,
    wherein the second slave device draws current from the second power supply by applying a second threshold voltage to a second transistor coupled between the second power supply and a second ground line such that the second transistor provides a second conductive pathway between the second power supply and the second ground line.

\* \* \* \* \*